US009855842B2

(12) United States Patent
Dietzel et al.

(10) Patent No.: US 9,855,842 B2
(45) Date of Patent: Jan. 2, 2018

(54) APPARATUS AND METHOD FOR GEAR DETECTION

(71) Applicant: TomTom Telematics B.V., Amsterdam (NL)

(72) Inventors: Lars Dietzel, Leipzig (DE); Rene Liebscher, Leipzig (DE)

(73) Assignee: TOMTOM TELEMATICS B.V., Amsterdam (NL)

(*) Notice: Subject to any disclaimer, the term of this patent is extended or adjusted under 35 U.S.C. 154(b) by 277 days.

(21) Appl. No.: 14/639,250

(22) Filed: Mar. 5, 2015

(65) Prior Publication Data
US 2016/0146336 A1 May 26, 2016

(30) Foreign Application Priority Data
Nov. 26, 2014 (GB) .................. 1420988.6

(51) Int. Cl.
*B60W 10/06* (2006.01)
*B60W 10/11* (2012.01)
(Continued)

(52) U.S. Cl.
CPC ....... *B60K 31/00* (2013.01); *B60W 30/18072* (2013.01); *B60W 30/18109* (2013.01); *B60W 30/18136* (2013.01); *B60W 40/09* (2013.01); *B60W 50/14* (2013.01); *F16H 59/44* (2013.01); *F16H 59/46* (2013.01); *F16H 61/0213* (2013.01); *F16H 61/0246* (2013.01); *G01C 21/3697* (2013.01); *G07C 5/004* (2013.01); *G07C 5/008* (2013.01); *G07C 5/02* (2013.01); *G07C 5/06* (2013.01); *G07C 5/0816* (2013.01); *G07C 5/0841* (2013.01); *G08G 1/0112* (2013.01); *G08G 1/0129* (2013.01); *G08G 1/0141* (2013.01); *G08G 1/09626* (2013.01); *G08G 1/09685* (2013.01); *G08G 1/096716* (2013.01); *G08G 1/096741* (2013.01); *G08G 1/096775* (2013.01); *G08G 1/096827* (2013.01); *G08G 1/096861* (2013.01); *B60K 2350/1092* (2013.01); *B60R 16/0236* (2013.01); *B60W 2030/1809* (2013.01); *B60W 2030/18081* (2013.01); *B60W 2050/0078* (2013.01); *B60W 2510/0623* (2013.01); *B60W 2510/0638* (2013.01); *B60W 2510/0642* (2013.01); *B60W 2510/0647* (2013.01); *B60W 2510/1005* (2013.01); *B60W 2520/10* (2013.01); *B60W 2520/105* (2013.01); *B60W 2530/14* (2013.01); *B60W 2550/14* (2013.01);
(Continued)

(58) Field of Classification Search
None
See application file for complete search history.

(56) References Cited

U.S. PATENT DOCUMENTS 6,064,935 A * 5/2000 You ............... F16H 61/0213
701/51
6,314,801 B1 * 11/2001 Reggiardo ........... F16H 61/20
73/112.01

(Continued)

Primary Examiner — Edwin A Young

(57) ABSTRACT

A method and apparatus is disclosed for determining the available gears of a geared vehicle based on the ratios of vehicle speed to engine speed, together with a method and apparatus for determining the current gear in which a geared vehicle is being driven based on the current ratio of vehicle speed to engine speed.

20 Claims, 4 Drawing Sheets

(51) Int. Cl.

| | | |
|---|---|---|
| *B60K 31/00* | (2006.01) | |
| *B60W 40/09* | (2012.01) | |
| *G07C 5/00* | (2006.01) | |
| *G07C 5/08* | (2006.01) | |
| *F16H 59/44* | (2006.01) | |
| *F16H 59/46* | (2006.01) | |
| *F16H 61/02* | (2006.01) | |
| *B60W 50/14* | (2012.01) | |
| *B60W 30/18* | (2012.01) | |
| *G01C 21/36* | (2006.01) | |
| *G08G 1/01* | (2006.01) | |
| *G07C 5/02* | (2006.01) | |
| *G07C 5/06* | (2006.01) | |
| *G08G 1/0962* | (2006.01) | |
| *G08G 1/0967* | (2006.01) | |
| *G08G 1/0968* | (2006.01) | |
| *B60R 16/023* | (2006.01) | |
| *B60W 50/00* | (2006.01) | |
| *F16H 63/42* | (2006.01) | |

(52) U.S. Cl.
CPC ... *B60W 2550/141* (2013.01); *B60W 2550/20* (2013.01); *B60W 2550/402* (2013.01); *B60W 2560/06* (2013.01); *B60W 2710/0655* (2013.01); *B60Y 2300/52* (2013.01); *F16H 2061/0218* (2013.01); *F16H 2063/426* (2013.01); *Y02T 10/76* (2013.01); *Y02T 10/84* (2013.01)

(56) References Cited

U.S. PATENT DOCUMENTS

2011/0148614 A1\* 6/2011 Wagner ............... B60W 40/09
340/439
2013/0184949 A1\* 7/2013 Saito .................. B60W 10/11
701/58

\* cited by examiner

APPARATUS AND METHOD FOR GEAR DETECTION

CROSS-REFERENCES TO RELATED APPLICATIONS

The application claims priority to United Kingdom Patent Application No. 1420988.6, filed Nov. 26, 2014; the entire contents of which is incorporated herein by reference.

FIELD OF THE INVENTION

The present invention relates to a method and apparatus for determining a gear set of a vehicle, optionally using data collected via the OBD port of the vehicle.

BACKGROUND OF THE INVENTION

Increasingly it is desired to improve a fuel economy of vehicles, particularly, although not exclusively, vehicles powered by fossil fuels, such as petrol and diesel. Although it will be realised that improving the fuel economy of any vehicle, including electric, hybrid and hydrogen powered vehicles, for example, is also desired. Some efforts at improving the fuel economy of vehicles are focussed on increasing an efficiency of the vehicle, such as a mechanical and/or electrical efficiency of the vehicle. It has also been realised that the manner in which a vehicle is driven can have a significant impact of the vehicle's economy.

Knowing the current gear and the maximum gear of a vehicle can be useful for various purposes. For example, having this information allows current gear information to be collected or driving behaviour to be monitored. This information also allows the development of methods and systems for monitoring the performance of drivers of vehicles over one or more journeys, and methods and systems for providing feedback to a driver in order to promote more economical driving.

It is possible to get vehicle status information from an on-board diagnostics (OBD) port of the vehicle. There is a set of standard parameter id's (pids) that may be provided by a majority of current road vehicles. The currently engaged gear and the maximum gear are not part of the standard set.

Therefore, a method of determining at least the currently engaged gear and the maximum gear for a wide range of vehicles is required.

SUMMARY OF THE INVENTION

In accordance with a first aspect of the present invention there is provided a method of determining a plurality of available gears of a geared vehicle, comprising:
receiving a plurality of speed-rpm ratios of the vehicle, each based on a speed of the vehicle and a corresponding speed of a drive unit of the vehicle;
assigning each of the plurality of speed-rpm ratios to a relevant one of a plurality of speed-rpm ratio bins in a histogram;
thresholding the histogram to identify a plurality of peaks, each peak having an associated speed-rpm ratio; and
determining a plurality of available gears as the associated speed-rpm ratios of the plurality of peaks.

In accordance with a second aspect of the present invention there is provided a method of determining an available gear of a geared vehicle, comprising:
receiving a plurality of successive speed-rpm ratios of the vehicle, each based on a speed of the vehicle and a corresponding speed of a drive unit of the vehicle;
evaluating a consistency measure indicative of a variation in the plurality of successive speed-rpm ratios over time; and
determining that the plurality of successive speed-rpm ratios correspond to an available gear when the consistency measure is less than a predetermined threshold.

According to this second aspect, the method can further comprise, when the plurality of successive speed-rpm ratios are determined to correspond to an available gear, adding an entry to a gear table for the available gear based on the plurality of successive speed-rpm ratios, said gear table comprising a plurality of entries, each entry associating an available gear of the geared vehicle with a speed-rpm ratio. The method can, additionally or alternatively, comprise, when the plurality of successive speed-rpm ratios are determined to correspond to an available gear, adjusting an existing entry in a gear table for the available gear based on the plurality of successive speed-rpm ratios, said gear table comprising a plurality of entries, each entry associating an available gear of the geared vehicle with a speed-rpm ratio.

The method, according to either the first aspect or the second aspect, can further comprise: receiving a speed of the drive unit of the vehicle when the vehicle is standing still; storing the received speed of the drive unit as a no-load rpm; and subsequently ignoring at least one of the received speed-rpm ratios of the vehicle if the speed of the drive unit of the vehicle on which at least one speed-rpm ratio is based is within a predetermined threshold of the no-load rpm.

The determination of an available gear of the geared vehicle can be additionally based on an indication of an acceleration state of the vehicle. The indication of the acceleration state of the vehicle can be given by an acceleration signal or a plurality of successive speed signals.

The determination of an available gear of the geared vehicle can additionally include a determination of a reverse gear based on an acceleration signal indicative of reverse acceleration following at least one speed signal indicative of the vehicle speed being zero.

In embodiments according to either the first or second aspects the speed of the vehicle and the corresponding speed of a drive unit of the vehicle can be obtained from an on-board diagnostics (OBD) port of the vehicle.

The present invention extends to a system for carrying out a method in accordance with any of the aspects or embodiments of the invention herein described.

Thus, in accordance with a further aspect of the invention, there is provided a system for determining a plurality of available gears of a geared vehicle, comprising:
means for receiving a plurality of speed-rpm ratios of the vehicle, each based on a speed of the vehicle and a corresponding speed of a drive unit of the vehicle;
means for assigning each of the plurality of speed-rpm ratios to a relevant one of a plurality of speed-rpm ratio bins in a histogram;
means for thresholding the histogram to identify a plurality of peaks, each peak having an associated speed-rpm ratio; and
means for determining a plurality of available gears as the associated speed-rpm ratios of the plurality of peaks.

Similarly, in accordance with a further aspect of the invention, there is provided a system for determining an available gear of a geared vehicle, comprising:
means for receiving a plurality of successive speed-rpm ratios of the vehicle, each based on a speed of the vehicle and a corresponding speed of a drive unit of the vehicle;

means for evaluating a consistency measure indicative of a variation in the plurality of successive speed-rpm ratios over time; and means for determining that the plurality of successive speed-rpm ratios correspond to an available gear when the consistency measure is less than a predetermined threshold.

As will be appreciated by those skilled in the art, these further aspects of the present invention can and preferably do include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

As will be appreciated by those skilled in the art, these further aspects of the present invention can and preferably do include any one or more or all of the preferred and optional features of the invention described herein in respect of any of the other aspects of the invention, as appropriate.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The system of the present invention in any of its embodiments may be in the form of any suitable device. In general, the system of the present invention may be at least one processing device. The or a processing device may be a device of a mobile device, such as a device have a connector for connecting the device to a vehicle on-board diagnostics (OBD) port to receive data, and optionally power, therefrom, such as the speed of the vehicle and the corresponding speed of a drive unit of the vehicle. Regardless of its implementation, a device used in accordance with the present invention in any of its aspects or embodiments may comprise a processor and memory; the processor and memory cooperate to provide an execution environment in which a software operating system may be established.

Thus, in accordance with a further aspect of the invention, there is provided an apparatus for determining a plurality of available gears of a geared vehicle comprising: one or more processors; and a memory comprising instructions which, when executed by the one or more processors, cause the apparatus to:

receive a plurality of speed-rpm ratios of the vehicle, each based on a speed of the vehicle and a corresponding speed of a drive unit of the vehicle;

assign each of the plurality of speed-rpm ratios to a relevant one of a plurality of speed-rpm ratio bins in a histogram;

threshold the histogram to identify a plurality of peaks, each peak having an associated speed-rpm ratio; and determine a plurality of available gears as the associated speed-rpm ratios of the plurality of peaks.

Similarly, in accordance with a further aspect of the invention, there is provided an apparatus for determining an available gear of a geared vehicle comprising: one or more processors; and a memory comprising instructions which, when executed by the one or more processors, cause the apparatus to:

receive a plurality of successive speed-rpm ratios of the vehicle, each based on a speed of the vehicle and a corresponding speed of a drive unit of the vehicle;

evaluate a consistency measure indicative of a variation in the plurality of successive speed-rpm ratios over time; and determine that the plurality of successive speed-rpm ratios correspond to an available gear when the consistency measure is less than a predetermined threshold.

In embodiments, a gear table determined in accordance with any of the aspects and embodiments described above, or indeed in any other manner known in the art, is used to determine a current gear of a geared vehicle.

Thus, in accordance with a further aspect of the invention, there is provided a method of determining a current gear of a geared vehicle, comprising:

receiving a speed-rpm ratio of the vehicle, based on a speed of the vehicle and a corresponding speed of a drive unit of the vehicle;

evaluating a difference between the speed-rpm ratio and a speed-rpm ratio from an entry in a gear table, said gear table comprising a plurality of entries, each entry associating an available gear of the geared vehicle with a speed-rpm ratio; and determining that the current gear of the vehicle is the available gear of the entry in the gear table when the difference is within a predetermined threshold.

In embodiments, the method can further comprise: comparing the speed of the drive unit of the vehicle to a stored no-load rpm, said no-load rpm being the speed of the drive unit when the vehicle is standing still; and determining the geared vehicle is not in a gear when the comparison indicates the speed of the drive unit is within a predetermined threshold of the stored no-load rpm.

The determination of the current gear of the geared vehicle can be additionally based on an indication of an acceleration state of the vehicle. The indication of the acceleration state of the vehicle can be given by an acceleration signal or a plurality of successive speed signals.

The determination of the current gear of the geared vehicle can additionally include a determination of a reverse gear based on an acceleration signal indicative of reverse acceleration following at least one speed signal indicative of the vehicle speed being zero.

In embodiments, the method can further comprise transmitting, optionally wirelessly transmitting, the determined current gear of the geared vehicle to a remote device.

The present invention extends to a system for carrying out a method in accordance with the aspect or associated embodiments of the invention herein described.

Thus, in accordance with a further aspect of the invention, there is provided a system for determining a current gear of a geared vehicle, comprising:

means for receiving a speed-rpm ratio of the vehicle, based on a speed of the vehicle and a corresponding speed of a drive unit of the vehicle;

means for evaluating a difference between the speed-rpm ratio and a speed-rpm ratio from an entry in a gear table, said gear table comprising a plurality of entries, each entry associating an available gear of the geared vehicle with a speed-rpm ratio; and means for determining that the current gear of the vehicle is the available gear of the entry in the gear table when the difference is within a predetermined threshold.

As will be appreciated by those skilled in the art, these further aspects of the present invention can and preferably do include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

As will be appreciated by those skilled in the art, these further aspects of the present invention can and preferably do include any one or more or all of the preferred and optional features of the invention described herein in respect of any of the other aspects of the invention, as appropriate.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The system of the present invention in any of its embodiments may be in the form of any suitable device. In general, the system of the present invention may be at least one processing device. The or a processing device may be a device of a mobile device, such as a device have a connector for connecting the device to a vehicle on-board diagnostics (OBD) port to receive data, and optionally power, therefrom, such as the speed of the vehicle and the corresponding speed of a drive unit of the vehicle. Regardless of its implementation, a device used in accordance with the present invention in any of its aspects or embodiments may comprise a processor and memory; the processor and memory cooperate to provide an execution environment in which a software operating system may be established.

Thus, in accordance with a further aspect of the invention, there is provided an apparatus for determining a current gear of a geared vehicle comprising: one or more processors; and a memory comprising instructions which, when executed by the one or more processors, cause the apparatus to:

receive a speed-rpm ratio of the vehicle, based on a speed of the vehicle and a corresponding speed of a drive unit of the vehicle;

evaluate a difference between the speed-rpm ratio and a speed-rpm ratio from an entry in a gear table, said gear table comprising a plurality of entries, each entry associating an available gear of the geared vehicle with a speed-rpm ratio; and determine that the current gear of the vehicle is the available gear of the entry in the gear table when the difference is within a predetermined threshold.

As will be appreciated by those skilled in the art, these further aspects of the present invention can and preferably do include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

As will be appreciated by those skilled in the art, these further aspects of the present invention can and preferably do include any one or more or all of the preferred and optional features of the invention described herein in respect of any of the other aspects of the invention, as appropriate.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The system of the present invention in any of its embodiments may be in the form of any suitable device. In general, the system of the present invention may be at least one processing device. The or a processing device may be a device of a portable device that can be integrated or removably mounted within a vehicle, such as a vehicle tracking device or a portable navigation device. Regardless of its implementation, a device used in accordance with the present invention in any of its aspects or embodiments may comprise a processor and memory; the processor and memory cooperate to provide an execution environment in which a software operating system may be established.

Methods in accordance with the present invention may be implemented at least partially using software, e.g. computer programs. The present invention thus also extends to a computer program comprising computer readable instructions executable to perform a method according to any of the embodiments of the invention.

The invention thus also extends to a computer software carrier comprising software which when used to operate a system or apparatus comprising data processing means causes, in conjunction with said data processing means, said apparatus or system to carry out the steps of a method in accordance with embodiments of the present invention. Such a computer software carrier could be a non-transitory physical storage medium, such as a ROM chip, CD ROM or disk, or could be a signal, such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the present invention will now be described, by way of example only, and with reference to the accompanying drawings, in which.

DETAILED DESCRIPTION OF THE PREFERRED EMBODIMENTS

Embodiments of the invention are directed to methods and systems for monitoring the performance of drivers of vehicles over one or more journeys, and methods and systems for providing feedback to a driver in order to promote more economical driving.

Figure 1:
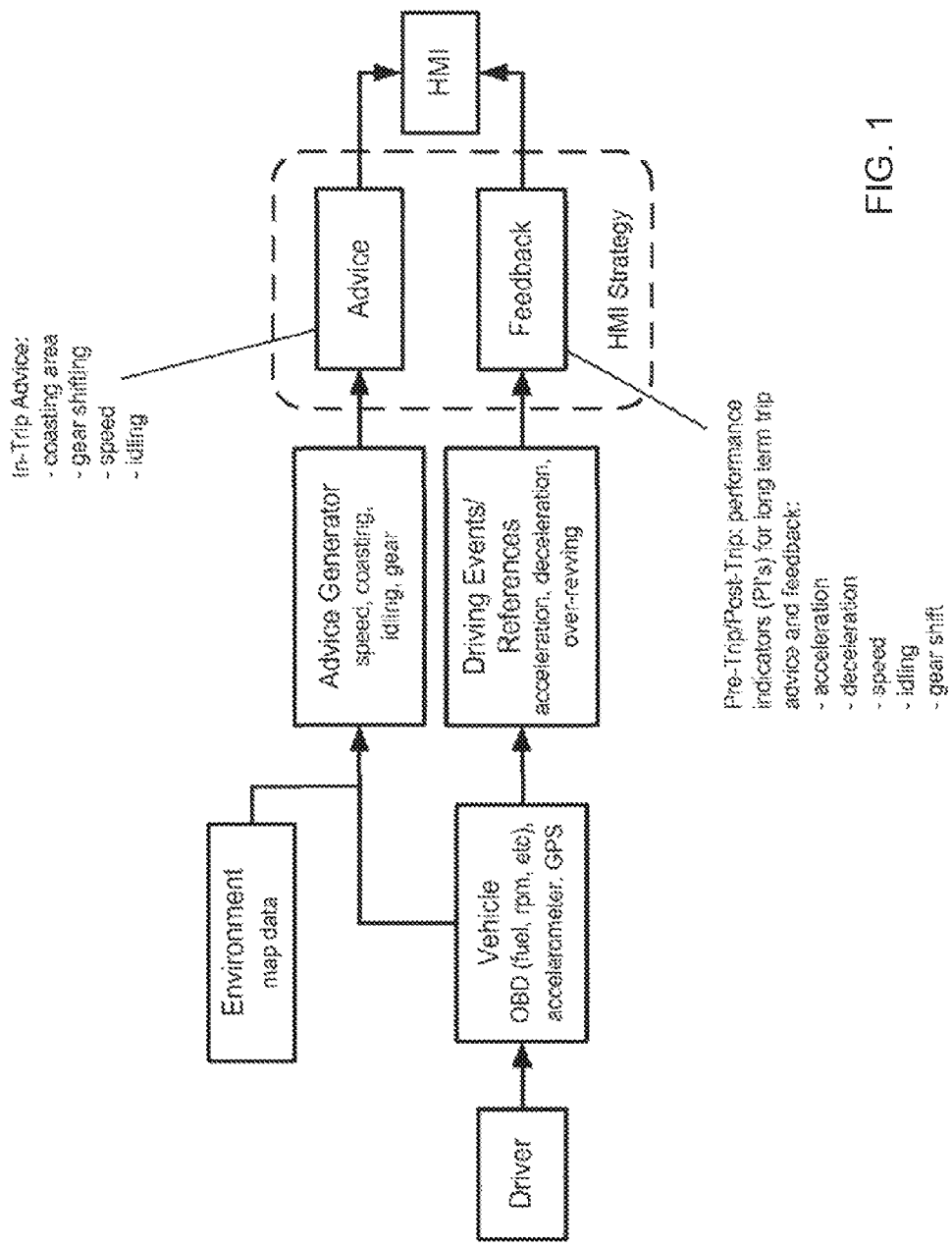
FIG. 1 is an illustration of a system for providing driver feedback.

An system for proving driver feedback is shown in FIG. 1. As shown in FIG. 1, the driver feedback comprises two components: feedback on current or historic driving performance (to be studied by the driver before beginning a trip or after having completed a trip); and advice on how driving styles can be modified to achieve more economical driving (which is typically given during a trip). The advice may comprise advice on an optimal or "green" speed to achieve maximum economical results; times/areas when "coasting" is possible; gear choice and when to change gear; etc. The feedback may comprise counts of events with harsh acceleration or declaration, speeding events (with respect to the speed limit and/or green speed), inefficient gear changes (over-revving), etc. The feedback may also comprise indicators as to how current and/or historic driving performance equates to predetermined goals, which may be set by the driver or may be set remotely by a fleet manager.

A summary of the each of the aspects of the invention is given below:

The determination of a list of available gears in a geared vehicle, including a vehicle's highest (or maximum) gear, using vehicle speed and engine speed (rpm) values obtainable, for example, over a vehicle's on-board diagnostics (OBD) port The use of the determined list of available gears, together with current vehicle speed and engine speed values obtained, e.g. from the vehicle's OBD port, to determine a current gear System Architecture The vehicle may be of any type of vehicle including a conventional (fossil fuel) powered vehicle, e.g. petrol or diesel, a hybrid vehicle, a hydrogen powered vehicle, a fuel cell powered vehicle or an electric vehicle. Embodiments of the invention will be described with reference to a vehicle having an engine (or drive unit) operative at an engine speed and fuel being supplied to the engine (or being consumed by the engine) at a fuel rate. It will, however, be realised that these terms may be construed accordingly to encompass the aforementioned types of vehicles.

Figure 2:
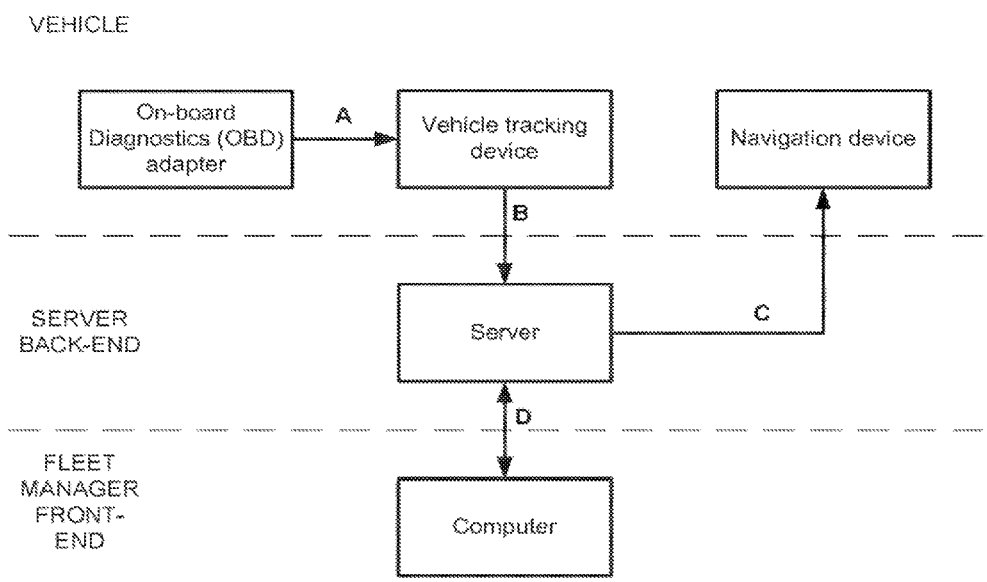
FIG. 2 is an illustration of a system according to an embodiment of the present invention.

The system of the invention is exemplified by FIG. 2 in which the vehicle can include: an on-board diagnostics (OBD) adapter; a vehicle tracking device; and a navigation device. The vehicle tracking device can be arranged to communicate with a server, which in turn is arranged to communicate with the navigation device in the vehicle and a computer, such as in the base of operations of the fleet manager. While the system the system shows three distinct devices in the vehicle: the OBD adapter; the vehicle tracking device and the navigation device, it will be appreciated that the vehicular components of the system can be shared between a greater number or a fewer number of devices as desired. Similarly, while FIG. 2 shows data being transmitted to the server only from the vehicle tracking device, in other embodiments data can be sent to the server from any of the vehicular devices as desired. The functionality of each of the components shown in FIG. 2 will now be described in more detail.

OBD Adapter:

The adapter device comprises an interface unit for communicating with one or more systems of the vehicle. The interface unit may be removably coupleable to an OBD port of the vehicle to receive data indicative of one or more parameters associated with the vehicle. The OBD port provides the one or more parameters to the interface unit from a communication bus of the vehicle. It will be realised, however, that the interface unit may communicate with the vehicle via other connections such as a via a wireless connection. The adapter device is therefore preferably configured to collect data from the OBD port in the vehicle, such as engine speed (rpm), vehicle speed, and to determine other information derived from such OBD data, such as the current gear, maximum gear, fuel consumption, etc, and to deliver the data to the vehicle tracking device. In other words, the data transmitted, in a wired and/or wireless manner, to the vehicle tracking device is indicative of a current state of the vehicle. It will be appreciated, however, that the speed of the vehicle may be determined in other ways, such as via received wireless location determining signals.

Vehicle Tracking Device:

The tracking device comprises a position determining device, such as a global navigation satellite system (GNSS) receiver, e.g. GPS or GLONASS. It will be appreciated, however, that other means may be used, such as using the mobile telecommunications network, surface beacons or the like. The positioning determining device generates tracking data, such as time-stamped positions, indicative of the change in position of the device over time. The tracking device further comprises one or more communication devices that are arranged to communicate with the OBD adapter, the navigation device and the server, either using a wired or wireless connection. The one or more communication devices can comprise a short range wireless transceiver, such as a Bluetooth transceiver, e.g. for communicating with the OBD adapter and the navigation device, and can comprise a mobile telecommunications transceiver, such as a GPRS or GSM transceiver, e.g. for communicating with the server. The tracking device further comprises at least one processor arranged to aggregate certain data for use in the subsequent generation of certain performance indicators (as discussed in more detail below), e.g. an over-revving performance indicator. For over-revving, the tracking device monitors the engine speed (obtained from the OBD adapter) and generates over-revving events.

Navigation Device:

The navigation device comprises at least one processor and a display device. The navigation device may be capable of one or more of: calculating a route to be traveled to a desired destination; and providing navigation instructions to guide the driver along a calculated route to reach a desired destination. The at least one processor is arranged to cause performance indicators (e.g. obtained from the server) to be displayed on the display device, e.g. before, during and/or after a trip. The at least one processor can be further arranged to display indicators on the display device, such as an indicator to change up in gear, e.g. if it is determined that the vehicle is not currently in the maximum gear.

Server:

The server comprises at least one processor and a communications device for communicating with one of more of the vehicular devices, preferably the vehicle tracking device. The at least one processor is arranged to calculate at least one performance indicator for a trip.

Computer:

The computer is in communication with the server, and is used by a fleet manager to review the performance of the drivers of their fleet of vehicles based on the determined performance indicators.

Gear Detection

According to embodiments of the invention, there is provided methods and systems of determining gears of geared vehicle using vehicle speed and engine speed ratios of the vehicle, e.g. obtained over the OBD port of the vehicle using the OBD adapter device. The engine speed is typically represented using the unit rpm (revolutions per minute), which is a measure of the frequency of rotation of the engine. In standard gearboxes the rpm-speed ratios are expected to be constant for each gear, and thus having a list of all ratios would allow a currently engaged gear to be determined using a currently determined rpm-speed ratio.

Figure 3:
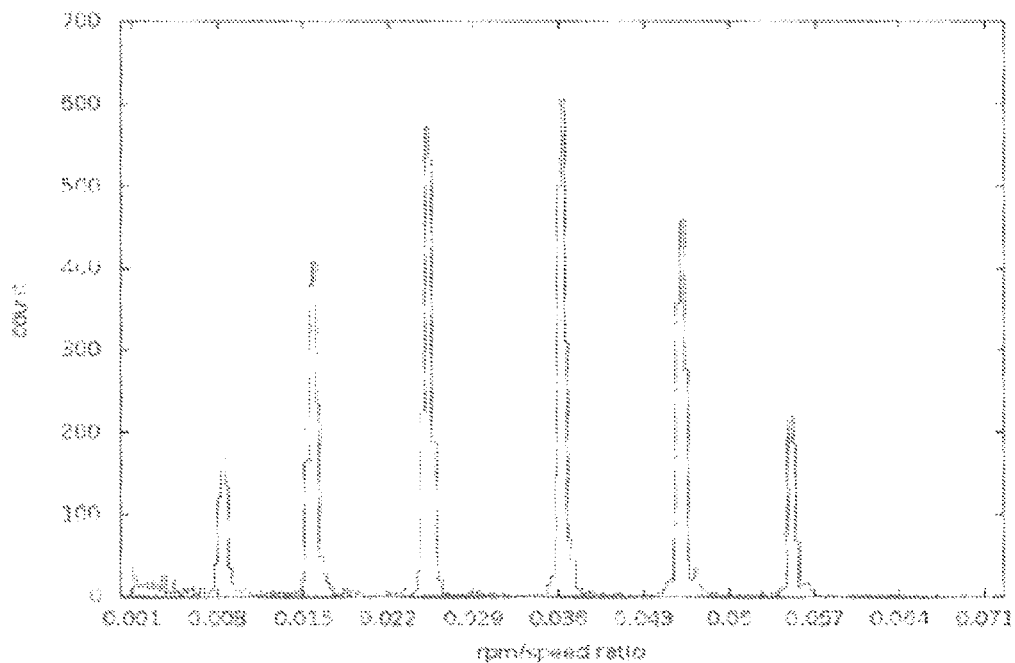
FIG. 3 is an illustration of a histogram that is generated according to an embodiment of the first aspect of the present invention.

A first embodiment uses a histogram based approach. In this embodiment, each of a plurality of speed-rpm ratios is assigned to an appropriate speed-rpm ratio bin (from among a plurality of speed-rpm ratio bins) to generate a histogram. A thresholding process can be applied to the histogram to identify a plurality of peaks, each peak being a speed-rpm ratio that relates to an engaged gear of the vehicle. These identified peaks can then be added to a gear table that has a plurality of entries, each entry being associated with an available gear of the vehicle and the speed-rpm ratio determined from the peak. An example of a histogram that is generated according to this embodiment is shown in FIG. 3. An advantage of this embodiment is that a currently engaged gear can be determined from a single sampled rpm-speed value. However, for example, some gears of the vehicle, e.g. reverse gear or first gear, may be rarely used and can be hard to identify. The method can also be difficult to implement if used in an OBD adapter (or other embedded device) which often has limited computer memory and processing resources, since the histogram table can be relatively large (depending on its level of granularity).

A second embodiment uses a continuous adaptation approach. In this embodiment, a plurality of successive speed-rpm ratios are obtained, and a determination made of a consistency measure indicative of a variation in the plurality of ratios. If consistency measure is within a predetermined limit, i.e. the successive ratios are effectively constant, then the observed 'constant' ratio can be said to be a result of a gear being engaged. A ratio found this way can be added as a new entry to a pre-existing gear table, or if similar to an existing entry used to fine-tune the speed-rpm ratio associated with the appropriate gear. Advantages of this embodiment are that the method is less impacted by noise often found in the data obtained from the OBD port, since the method is analysing relatively small sets of successive samples. Furthermore, the method requires less computational memory and processing resources in comparison to the first embodiment, and thus can be implemented more easily in an OBD adapter (or other embedded device).

Figure 4:
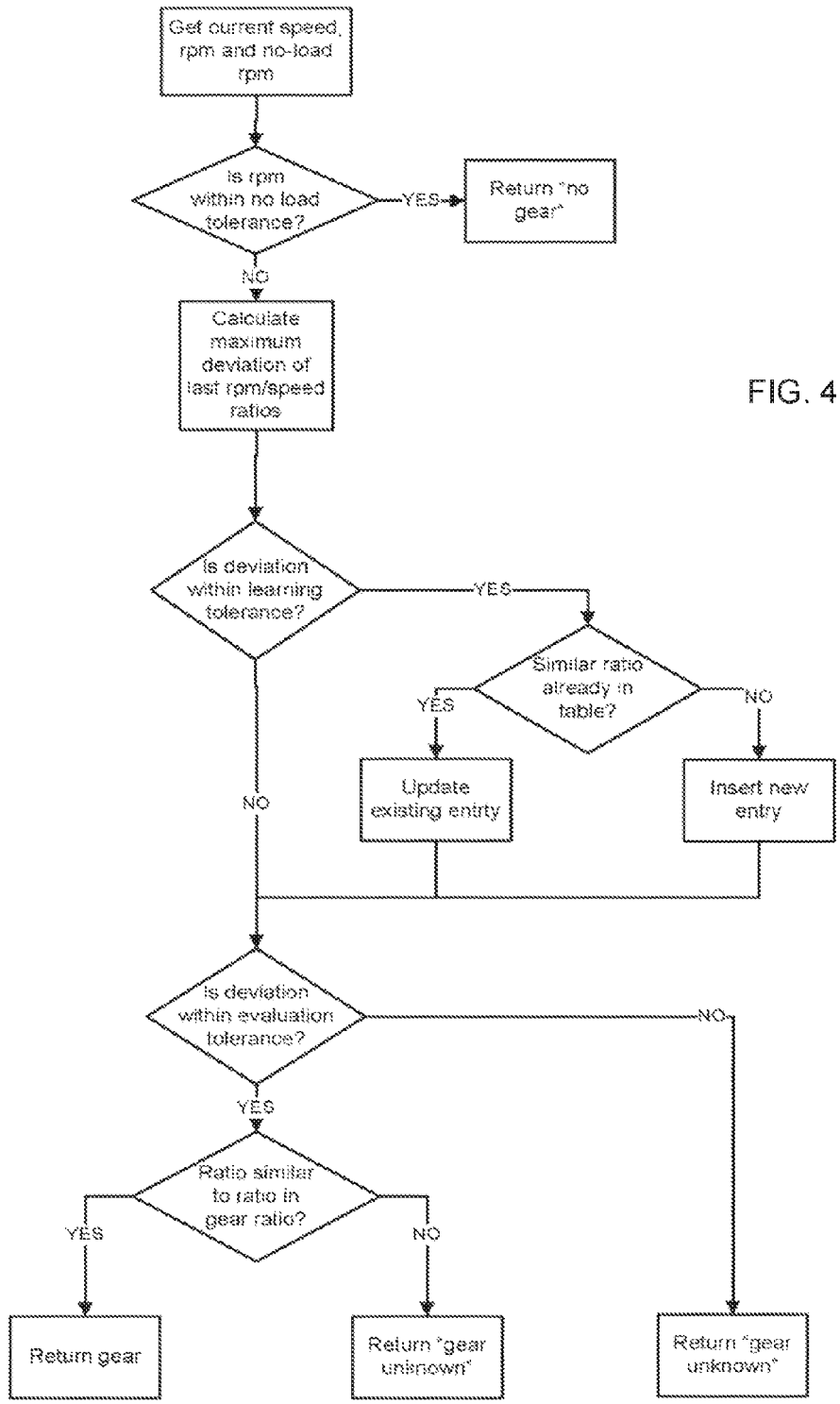
FIG. 4 is a flowchart showing an exemplary implementation of a gear detection algorithm according to an embodiment of the second aspect of the present invention.

An exemplary detailed implementation a gear detection algorithm according to the second embodiment is shown in FIG. 4. In this implementation the gear table is updated whenever the rpm-speed ratio is constant within a certain tolerance for a certain amount of samples. The current gear is returned whenever the rpm-speed ratio is constant with a certain (e.g. less strict) tolerance for a certain amount of samples. In this embodiment, gear ratios need to be detected multiple times to be considered stable. Unstable gear ratios are not taken into account when returning the current gear. A cyclic clean-up is used to remove unstable gear ratios.

Other improvements to the method of the second embodiment to ensure the gear table is accurate can include the use of:
- acceleration data from one or more accelerometers, since acceleration in a forward direction makes it more likely that a gear is engaged;
- other data from the OBD port, such as engine load, pedal position, etc
- speed data, since an increase in speed is again indicative that a gear is engaged.

Figure 5:
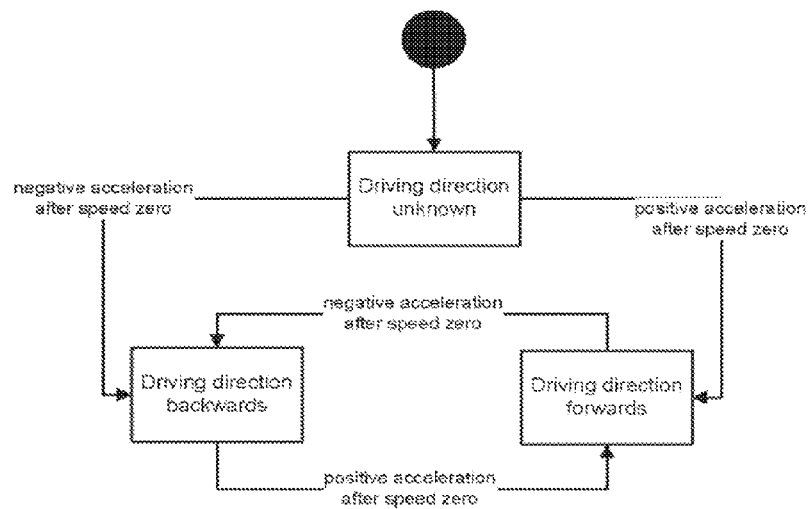
FIG. 5 is a flowchart showing an exemplary implementation of a reverse gear detection algorithm according to an embodiment of the present invention.

As will be appreciated, the method of the second embodiment exemplified in FIG. 4 does not allow for the accurate detection of the reverse gear. This is because the reverse gear is typically only engaged for a short period of time. Although it can, in some instances, be mistakenly identified as an additional gear between gear 1 and gear 2, which can cause inaccuracies when detecting the current gear. A method of accurately detecting the reverse gear can use acceleration data and speed data, e.g. as shown in FIG. 5. In this embodiment, a driving direction of the vehicle can be determined by identifying whether there is positive or negative acceleration after a period of zero speed; a positive acceleration indicating a forwards driving direction, and a negative acceleration indicating a backwards driving direction.

Thus, the invention encompasses a method of determining a current gear of a geared vehicle. The method can comprise receiving a speed-rpm ratio of the vehicle based on a speed of the vehicle and a corresponding rpm of a drive unit of the vehicle, e.g. using an OBD adapter connected to the OBD port of the vehicle. A difference is preferably calculated between the speed-rpm ratio and an available speed-rpm ratio corresponding to a predetermined available gear of the vehicle. A determination is preferably made that the speed-rpm ratio corresponds to an available gear if the difference is within a predetermined tolerance limit; this available gear then being assigned as the current gear. The predetermined available gears are taken from a gear table created in accordance with one of the first and second methods described above.

Any of the methods in accordance with the invention as described above may be implemented at least partially using software, e.g. computer programs. The present invention thus also extends to a computer program comprising computer readable instructions executable to perform, or to cause a computing device, e.g. OBD adapter, vehicle tracking device, navigation device, server, etc, to perform, a method according to any of the above described aspects or embodiments of the invention. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

The invention claimed is:

1. A method of determining an available gear of a geared vehicle, comprising:
   receiving a plurality of successive speed-rpm ratios of the vehicle, each based on a speed of the vehicle and a corresponding speed of a drive unit of the vehicle;
   evaluating a consistency measure indicative of a variation in the plurality of successive speed-rpm ratios over time;
   determining that the plurality of successive speed-rpm ratios correspond to an available gear when the consistency measure is less than a predetermined threshold; and
   upon determining that the plurality of successive speed-rpm ratios correspond to an available gear, performing a corresponding update of a gear table, the gear table configured to be used for determining current gears of a geared vehicle.

2. The method of claim 1, comprising, when the plurality of successive speed-rpm ratios are determined to correspond to an available gear, performing the corresponding update of the gear table by adding an entry to a gear table for the available gear based on the plurality of successive speed-rpm ratios, said gear table comprising a plurality of entries, each entry associating an available gear of the geared vehicle with a speed-rpm ratio.

3. The method of claim 1, comprising, when the plurality of successive speed-rpm ratios are determined to correspond to an available gear, performing the corresponding update of the gear table by adjusting an existing entry in a gear table for the available gear based on the plurality of successive speed-rpm ratios, said gear table comprising a plurality of entries, each entry associating an available gear of the geared vehicle with a speed-rpm ratio.

4. The method of claim 1, further comprising:
receiving a speed of the drive unit of the vehicle when the vehicle is standing still;
storing the received speed of the drive unit as a no-load rpm; and
subsequently ignoring at least one of the received speed-rpm ratios of the vehicle if the speed of the drive unit of the vehicle on which at least one speed-rpm ratio is based is within a predetermined threshold of the no-load rpm.

5. The method of claim 1, wherein the determination of an available gear of the geared vehicle is additionally based on an indication of an acceleration state of the vehicle.

6. The method of claim 5, wherein the indication of the acceleration state of the vehicle is given by an acceleration signal or a plurality of successive speed signals.

7. The method of claim 6, wherein the determination of an available gear of the geared vehicle includes a determination of a reverse gear based on an acceleration signal indicative of reverse acceleration following at least one speed signal indicative of the vehicle speed being zero.

8. The method of claim 1, wherein the speed of the vehicle and the corresponding speed of a drive unit of the vehicle is obtained from an on-board diagnostics (OBD) port of the vehicle.

9. A method of determining a current gear of a geared vehicle, comprising:
receiving a speed-rpm ratio of the vehicle, based on a speed of the vehicle and a corresponding speed of a drive unit of the vehicle;
evaluating a difference between the speed-rpm ratio and a speed-rpm ratio from an entry in a gear table, said gear table comprising a plurality of entries, each entry associating an available gear of the geared vehicle with a speed-rpm ratio, and said gear table having been determined in accordance with the method of claim 1; and
determining that the current gear of the vehicle is the available gear of the entry in the gear table when the difference is within a predetermined threshold.

10. The method of claim 9, further comprising:
comparing the speed of the drive unit of the vehicle to a stored no-load rpm, said no-load rpm being the speed of the drive unit when the vehicle is standing still; and
determining the geared vehicle is not in a gear when the comparison indicates the speed of the drive unit is within a predetermined threshold of the stored no-load rpm.

11. The method of claim 9, wherein the determination of the current gear of the geared vehicle is additionally based on an indication of an acceleration state of the vehicle.

12. The method of claim 11, wherein the indication of the acceleration state of the vehicle is given by an acceleration signal or a plurality of successive speed signals.

13. The method of claim 9, wherein the determination of the current gear of the geared vehicle includes a determination of a reverse gear based on an acceleration signal indicative of reverse acceleration following at least one speed signal indicative of the vehicle speed being zero.

14. The method of claim 9, comprising wired and/or wirelessly transmitting information regarding the current gear of the geared vehicle to a remote device.

15. An apparatus for determining an available gear of a geared vehicle comprising: one or more processors; and a memory comprising instructions which, when executed by the one or more processors, cause the apparatus to:
receive a plurality of successive speed-rpm ratios of the vehicle, each based on a speed of the vehicle and a corresponding speed of a drive unit of the vehicle;
evaluate a consistency measure indicative of a variation in the plurality of successive speed-rpm ratios over time;
determine that the plurality of successive speed-rpm ratios correspond to an available gear when the consistency measure is less than a predetermined threshold; and
upon determining that the plurality of successive speed-rpm ratios correspond to an available gear, performing a corresponding update of a gear table, the gear table configured to be used for determining current gears of a geared vehicle.

16. The apparatus of claim 15, further comprising a connector for connecting the apparatus to a vehicle on-board diagnostics (OBD) port to receive the speed of the vehicle and the corresponding speed of a drive unit of the vehicle.

17. The apparatus of claim 15, wherein the instructions which, when executed by the one or more processors, further cause the apparatus to:
evaluate a difference between a received speed-rpm ratio and a speed-rpm ratio from an entry in a gear table, said gear table comprising a plurality of entries, each entry associating an available gear of the geared vehicle with a speed-rpm ratio; and
determine that a current gear of the vehicle is the available gear of the entry in the gear table when the difference is within a predetermined threshold.

18. The apparatus of claim 17, further comprising a wired transmitter and/or a wireless transmitter for transmitting information regarding the current gear of the geared vehicle to a remote device.

19. A non-transitory computer readable medium comprising computer readable instructions that, when executed by at least one processor of an apparatus, causes the apparatus to perform a method of determining an available gear of a geared vehicle, comprising:
receiving a plurality of successive speed-rpm ratios of the vehicle, each based on a speed of the vehicle and a corresponding speed of a drive unit of the vehicle;
evaluating a consistency measure indicative of a variation in the plurality of successive speed-rpm ratios over time;
determining that the plurality of successive speed-rpm ratios correspond to an available gear when the consistency measure is less than a predetermined threshold; and
upon determining that the plurality of successive speed-rpm ratios correspond to an available gear, performing a corresponding update of a gear table, the gear table configured to be used for determining current gears of a geared vehicle.

20. The non-transitory computer readable medium of claim 19, wherein the computer readable instructions, when executed, further cause the apparatus to:

evaluate a difference between a received speed-rpm ratio and a speed-rpm ratio from an entry in a gear table, said gear table comprising a plurality of entries, each entry associating an available gear of the geared vehicle with a speed-rpm ratio; and determine that the current gear of the vehicle is the available gear of the entry in the gear table when the difference is within a predetermined threshold.

\* \* \* \* \*